(12) United States Patent
Lukas et al.

(10) Patent No.: US 8,660,365 B2
(45) Date of Patent: Feb. 25, 2014

(54) SYSTEMS AND METHODS FOR PROCESSING EXTRACTED PLANE FEATURES

(75) Inventors: Jan Lukas, Melnik (CZ); Sara Susca, Minnetonka, MN (US); Ondrej Kotaba, Orlova (CZ)

(73) Assignee: Honeywell International Inc., Morristown, NJ (US)

( * ) Notice: Subject to any disclaimer, the term of this patent is extended or adjusted under 35 U.S.C. 154(b) by 720 days.

(21) Appl. No.: 12/846,265

(22) Filed: Jul. 29, 2010

(65) Prior Publication Data

US 2012/0027310 A1 Feb. 2, 2012

(51) Int. Cl.
*G06K 9/52* (2006.01)

(52) U.S. Cl.
USPC ........... 382/206; 382/103; 382/109; 382/153; 382/209; 382/284

(58) Field of Classification Search
USPC .......................... 382/103, 109, 153, 206, 209
See application file for complete search history.

(56) References Cited

U.S. PATENT DOCUMENTS

| | | | |
|---|---|---|---|
| 4,891,630 A | 1/1990 | Friedman et al. | |
| 5,383,013 A | 1/1995 | Cox | |
| 5,870,490 A | 2/1999 | Takahashi et al. | |
| 5,978,504 A | 11/1999 | Leger | |
| 5,988,862 A | 11/1999 | Kacyra et al. | |
| 6,343,159 B1 * | 1/2002 | Cuciurean-Zapan et al. | 382/284 |
| 6,476,803 B1 | 11/2002 | Zhang et al. | |
| 6,674,902 B1 * | 1/2004 | Kondo et al. ................ | 382/199 |
| 6,724,383 B1 | 4/2004 | Herken et al. | |
| 6,771,840 B1 | 8/2004 | Ioannou et al. | |
| 6,911,995 B2 | 6/2005 | Ivanov et al. | |
| 7,065,461 B2 | 6/2006 | Chang et al. | |
| 7,203,342 B2 | 4/2007 | Pedersen | |
| 7,215,810 B2 | 5/2007 | Kaufmann et al. | |

(Continued)

FOREIGN PATENT DOCUMENTS

| | | |
|---|---|---|
| EP | 2249311 | 11/2010 |
| GB | 2405776 | 3/2005 |
| WO | 0108098 | 2/2001 |

OTHER PUBLICATIONS

Roncella, "Extraction of Planar Patches From Point Clouds to Retrieve Dip and Dip Direction of Rock Discontinuities", Sep. 12, 2005, pp. 162-167, vol. 3.

(Continued)

*Primary Examiner* — Vu Le
*Assistant Examiner* — Aklilu Woldemariam
(74) *Attorney, Agent, or Firm* — Fogg & Powers LLC (57) ABSTRACT

Systems and methods for processing extracted plane features are provided. In one embodiment, a method for processing extracted plane features includes: estimating an area of each plane of a plurality of planes extracted from data collected by an imaging sensor; generating a list of detected planes including the area of each plane; filtering the list of detected planes to produce a list of candidates for merger, filtering the list of detected planes discarding any plane not satisfying an actual points received criteria; applying a primary merge algorithm to the list of candidates for merger that iteratively produces a list of merged planes by testing hypothetical merged planes against a merging criteria, the hypothetical merged planes each comprising a plane from the list of merged planes and a plane from the list of candidates for merger; and outputting a final list of planes.

17 Claims, 7 Drawing Sheets

(56) References Cited

U.S. PATENT DOCUMENTS

| | | | |
|---|---|---|---|
| 7,239,751 B1 | 7/2007 | Amador | |
| 7,436,988 B2 | 10/2008 | Zhang et al. | |
| 7,574,020 B2 | 8/2009 | Shamaie | |
| 7,605,817 B2 | 10/2009 | Zhang et al. | |
| 7,643,966 B2 | 1/2010 | Adachi et al. | |
| 7,956,862 B2 | 6/2011 | Zhang et al. | |
| 8,073,215 B2* | 12/2011 | Lu et al. | 382/128 |
| 8,199,977 B2 | 6/2012 | Krishnaswamy et al. | |
| 2003/0067461 A1* | 4/2003 | Fletcher et al. | 345/420 |
| 2005/0114059 A1 | 5/2005 | Chang et al. | |
| 2005/0196034 A1* | 9/2005 | Hattori et al. | 382/154 |
| 2006/0078197 A1* | 4/2006 | Mitsumoto et al. | 382/154 |
| 2006/0188849 A1 | 8/2006 | Shamaie | |
| 2007/0217682 A1 | 9/2007 | Motomura et al. | |
| 2007/0234230 A1* | 10/2007 | Pedersen | 715/783 |
| 2008/0013836 A1 | 1/2008 | Nakamura et al. | |
| 2008/0096152 A1 | 4/2008 | Cheang | |
| 2008/0167814 A1 | 7/2008 | Samarasekera et al. | |
| 2008/0310757 A1 | 12/2008 | Wolberg et al. | |
| 2009/0167759 A1 | 7/2009 | Ushida et al. | |
| 2009/0310867 A1 | 12/2009 | Matei et al. | |
| 2010/0034426 A1 | 2/2010 | Takiguchi et al. | |
| 2010/0053191 A1 | 3/2010 | Chang et al. | |
| 2010/0074473 A1* | 3/2010 | Kotaba | 382/106 |
| 2010/0149174 A1 | 6/2010 | Nakao et al. | |
| 2010/0220204 A1 | 9/2010 | Fruehauf et al. | |
| 2010/0315412 A1 | 12/2010 | Sinha et al. | |
| 2011/0102545 A1 | 5/2011 | Krishnaswamy et al. | |
| 2011/0153206 A1 | 6/2011 | Kotaba et al. | |
| 2011/0274343 A1 | 11/2011 | Krishnaswamy et al. | |

OTHER PUBLICATIONS

Schnabel, "Efficient RANSAC for Point-Cloud Shape Detection", "Computer Graphics Forum", Jun. 2007, pp. 214-226, vol. 26, No. 2, Publisher: Blackwell Publishing.

Yang, "Plane Detection in Point Cloud Data", Jan. 25, 2010, pp. 1-16.

U.S. Patent and Trademark Office, "Final Office Action", "U.S. Appl. No. 12/609,576", Dec. 31, 2012, pp. 1-10.

European Patent Office, "Office Action", "from Foreign Counterpart of U.S. Appl. No. 12/846,265", Jan. 17, 2012, pp. 1-7, Published in: EP.

European Patent Office, "European Search Report", "from EP counter part", mailed Dec. 27, 2011, Published in: EP.

Park et al., "Multiscale Surface Representation Scheme for Point Clouds", "Intelligent Signal Processing and Communication Systems, 2004", Nov. 18, 2004, pp. 232-237, Publisher: IEEE.

Tseng et al., "Automatic Plane Extraction from LIDAR Data Based on Octree Splitting and Merging Segmentation", "Geoscience and remote Sensing Symposium 2005", Jul. 2005, pp. 3281-3284, vol. 5, Publisher: IEEE.

Zavodny et al., "Region Extraction in Large-Scale Urban LIDAR data", "2009 IEEE 12th International Conference on Computer Vision Workshops", Sep. 2009, pp. 1801-1808, Publisher: IEEE.

European Patent Office, "Office Action", "from Foreign Counterpart of U.S. Appl. No. 12/775,865", Aug. 17, 2011, pp. 1-7, Published in: EP.

European Patent Office, "European Search Report", "from Foreign Counterpart of U.S. Appl. No. 12/775,865", Aug. 2, 2011, pp. 1-4, Published in: EP.

U.S. Patent and Trademark Office, "Final Office Action", "U.S. Appl. No. 12/775,865", Feb. 1, 2012, pp. 1-24.

U.S. Patent and Trademark Office, "Notice of Allowance", "U.S. Appl. No. 12/775,865", Apr. 27, 2012, pp. 1-16.

U.S. Patent and Trademark Office, "Office Action", "U.S. Appl. No. 12/775,865", Sep. 6, 2011, pp. 1-23.

U.S. Patent and Trademark Office, "Office Action", "U.S. Appl. No. 12,609,576", Aug. 5, 2013.

U.S. Patent and Trademark Office, "Office Action", "U.S. Appl. No. 12/609,576", Jul. 18, 2012.

Krishnaswamy, "U.S. Appl. No. 12/609,576", "Uncertainty Estimation of Planar Features ", filed Oct. 30, 2009, US.

Kotaba , "U.S. Appl. No. 12/644,559", "Systems and Methods for Matching Scenes Using Mutual Relations Between Features", filed Dec. 22, 2009 , US.

Krishnaswamy, "U.S. Appl. No. 12/775,865", "System and Method for Extraction of Features From a 3-D Point Cloud", filed May 7, 2010 , US.

Arras et al., "Feature Extraction and Scene Interpretation for Map-Based Navigation and Map Building", "Mobile Robotics XII", 1997, vol. 3210, Publisher: SPIE.

Barnat, J. et al., "Distributed LTL Model-Checking in SPIN", "International Workshop on SPIN Model Checking", 2001, pp. 200-216, Publisher: Springer-Verlag New York, Inc.

Bosnacki, D. et al., "Symmetric Spin", "Lecture Notes In Computer Science", 2000, pp. 1-19, No. 1885, Publisher: Springer-Verlag.

Bay et al., "SURF: Speeded Up Robust Features", "Proceedings of 9th European Conference on Computer Vision", May 7-13, 2006, Published in: Graz, Austria.

Bosnacki et al., "A Heuristic for Symmetry Reductions with Scalarsets", "Proc. Int. Symp. Formal Methods for Increasing Sofware Productivity", 2001, pp. 518-533, Publisher: Lecture Notes in Computer Science.

Brim, L. et al., "Distributed LTL Model Checking Based on Negative Cycle Detection", "Lecture Notes in Computer Science", 2001, pp. 96-107, vol. 2245, Publisher: Springer-Verlag.

Canny, John, "A Computational Approach to Edge Detection", "Transactions on Pattern Analysis and Machine Intelligence", Nov. 1986, pp. 679-698, vol. PAM1-8, No. 6, Publisher: IEEE.

"DARPA Grand Challenge '05", "available at http://www.darpa.mil/grandchallenge05/ accessed Jun. 9, 2010", Dec. 31, 2007, Publisher: DARPA.

"Navigation—The Future—Galileo", "available at http://www.esa.int/esaNA/galileo.html accessed Jun. 9, 2010", 2000, Publisher: European Space Agency (ESA).

"GLONASS Status", "Information—Analytical Centre available at http://www.glonass-ianc.rsa.ru/pls/htmldb/f?p=202:20:2275518349255099::NO accessed Jun. 9, 2010", 2006, Publisher: Russian Space Agency, Information-analytical centre.

"Global Navigation Satellite System", "available at http://www.spirent.com/Positioning-and-Navigation/GNSS.aspx", 2010, Publisher: Spirent Communications plc, accessed Jun. 9, 2010.

"Global Positioning System: Serving the World", "http://www.gps.gov/ accessed Jun. 9, 2010", , Publisher: USA.gov.

Haralick, Robert M., "Propagating Covariance in Computer Vision", "Performance Characterization in Computer Vision", Aug. 31, 2000, vol. 17, Publisher: Springer Series on Computational Imaging and Vision.

Harris et al., "A Combined Corner and Edge Detector", 1988, pp. 147-151, Publisher: The Plessey Company, Published in: United Kingdom.

Hendriks, M. et al., "Adding Symmetry Reduction to UPPAAL", "Lecture Notes in Computer Science", 2004, pp. 46-59, vol. 2791, Publisher: Springer Berlin.

Hoppe et al. , "Surface Reconstruction From Unorganized Points", 1992, pp. 71-78, Publisher: University of Washington.

Iosif, Radu, "Symmetry Reduction Criteria for Software Model Checking", "Lecture Notes in Computer Science", 2002, pp. 22-41, vol. 2318, Publisher: Springer-Verlag.

"Indian Space Research Organisation", "available at http://www.isro.org/ accessed Jun. 9, 2010", 2008, Publisher: ISRO.

Krishnaswamy et al., "Sensor Fusion for GNSS Denied Navigation", "IEEE/ION Position, Location, and Navigation Symposium", 2008, Publisher: IEEE.

Lerda, Flavio and Riccardo Sisto, "Distributed-Memory Model Checking with SPIN", "Lecture Notes In Computer Science", 1999, pp. 22-39, vol. 1680, Publisher: Springer-Verlag.

Lin, Chung-Chen and Rey-Jer You, "Planar Feature Extration from LIDAR Data Based on Tensot Analysis", "available at: http://www.aars-acrs.org/acrs/proceeding/ACRS2006/Papers/M-1_M5.pdf", 2006, Publisher: Asian Association on Remote Sensing.

(56) References Cited

OTHER PUBLICATIONS

Lingemann et al., "High-Speed Laser Localization for Mobile Robots", "Robotics and Autonomous Systems", 2005, pp. 275-296, vol. 51, Publisher: Elsevier B.V.

Lowe, D.G., "Distinctive Image Features from Scale-Invariant Keypoints", "International Journal of Computer Vision", Jan. 5, 2004, pp. 91-110, vol. 60, No. 2.

Manku, G. et al., "Structural Symmetry and Model Checking", "Lecture Notes in Computer Science", 1998, pp. 159-171, vol. 1427, Publisher: Springer-Verlag.

Norris, C. and David L. Dill, "Better Verification Through Symmetry", "IFIP Transactions", 1993, pp. 97-111, vol. A-32, Publisher: North-Holland Publishing Co.

Parra et al., "Robust Visual Odometry for Complex Urban Environments", "IEEE Intelligent Vehicles Symposium", Jun. 4-6, 2008, Publisher: IEEE, Published in: Eindhoven, The Netherlands.

Pauly et al., "Efficient Simplification of Point-Sampled Surfaces", "http://www.agg.ethz.ch/publications/journal_and_conference/#2002", 2002, Publisher: IEEE Visualization 2002.

Pauly et al., "Uncertainty and Variability in Point Cloud Surface Data", "http://www.agg.ethz.ch/publications/journal_and_conference/#2004", 2004, Publisher: Symposium on Point-Based Graphics.

Pauly et al., "Point-Based Multi-Scale Surface Representation", "http://www.agg.ethz.ch/publications/journal_and_conference/#2006", Apr. 2, 2006, pp. 177-193, vol. 25, No. 2, Publisher: ACM Transactions on Graphics 2006.

Rangarajan, M. et al., "Analysis of Distributed Spin Applied to Industrial-Scale Models", "Lecture Notes in Computer Science", Apr. 2004, vol. 2989, Publisher: Springer Verlag.

Shapiro, Linda and Robert Haralick, "Relational Matching", "Applied Optics", May 15, 1987, pp. 1845-1851, vol. 26, No. 10, Publisher: Optical Society of America, Published in: Seattle, WA.

Soehren, Wayne and Wes Hawkinson, "Prototype Personal Navigation System", "IEEE A&E Systems Magazine; Based on Presentation at PLANS 2006", Apr. 2008, Publisher: IEEE.

Soloviev, Andrey, "Tight Coupling of GPS, Laser Scanner, and Inertial Measurements for Navigation in Urban Environments", "Proceedings of IEEE/ION Position, Location, and Navigation Symposium (PLANS 2008)", May 6-8, 2008, Publisher: IEEE.

Spero, D.J. and R. A. Jarvis, "Simultaneous Localisation and Map Building: The Kidnapped Way", "Intelligent Robotics Research Center MECSE-3-2007", 2005, Publisher: Monash University.

Stern, Urlich and David L. Dill, "Parallelizing the Mur Verifier", "Formal Methods in System Design", 2001, pp. 117-129, vol. 18, No. 2, Publisher: Kluwer Academic Publishers.

Sara Susca, "GNSS-Independent Navigation Solution Using Integrated LiDAR Data", "Proceedings of the 2010 International Technical Meeting of the Institute of Navigation", Jan. 25-27, 2010, pp. 205-213, Publisher: ION.

"Tactical Advanced Land Inertial Navigator (TALIN)", Feb. 2007, Publisher: Honeywell International Inc.

"High Definition Lidar", "available at http://www.velodyne.com/lidar accessed Jun. 9, 2010", 2008, Publisher: Velodyne Acoustics, Inc.

Venable, Donald T., "Implementation of a 3D Imaging Sensor Aided Inertial Measurement Unit Navigation System", "Thesis", Aug. 2008, Publisher: Ohio University.

Veth et al., "Tightly-Coupled INS, GPS, and Imaging Sensors for Precision Geolocation", "Wright Patterson AFB, OH, http://www.docstoc.com/docs/1032359/Tightly-Coupled-INS-GPS-and-Imaging-Sensors-for-Precision-Geolocation", Jan. 2008, Publisher: Air Force Institute of Technology, Department of Electrical and Computer Engineering.

Von Hansen et al., "Cluster Analysis and Priority Sorting in Huge Point Clouds for Building Reconstruction", "Proceedings of the 18th International Conference on Pattern Recognition", 2006, pp. 23-26, Publisher: IEEE.

\* cited by examiner

SYSTEMS AND METHODS FOR PROCESSING EXTRACTED PLANE FEATURES

CROSS-REFERENCE TO RELATED APPLICATIONS

This application is related to co-pending U.S. patent application Ser. No. 12/775,865 entitled "SYSTEM AND METHOD FOR EXTRACTION OF FEATURES FROM A 3-D POINT CLOUD" filed on May 7, 2010, herein incorporated in its entirety by reference and referred to herein as the '865 application.

This application is related to co-pending U.S. patent application Ser. No. 12/644,559 entitled "SYSTEMS AND METHODS FOR MATCHING SCENES USING MUTUAL RELATIONS BETWEEN FEATURES" filed on Dec. 22, 2009, herein incorporated in its entirety by reference and referred to herein as the '848 application.

This application is related to co-pending U.S. patent application Ser. No. 12/609,576 entitled "UNCERTAINTY ESTIMATION OF PLANAR FEATURES" filed on Oct. 30, 2009, herein incorporated in its entirety by reference and referred to herein as the '576 application.

BACKGROUND

GPS-denied navigation solutions for unmanned navigation platforms under development and early deployment today utilize real-world images to estimate the 3-dimentional location of objects surrounding the platform. For example, methods currently exist for extracting features from Light Detection And Ranging (LiDAR) based point cloud images of captured real-world scenes. The results of these methods, however, suffer due to the false detection of multiple planes in the LiDAR image where only a single plane exists in the real-world scene. Such false positives increase the processing resources necessary to resolve the point cloud image into reliable 3-dimentional information about the scene.

For the reasons stated above and for other reasons stated below which will become apparent to those skilled in the art upon reading and understanding the specification, there is a need in the art for improved systems and methods for reducing false positive detections of planes in GPS-denied navigation solutions.

SUMMARY

The Embodiments of the present invention provide methods and systems for processing extracted plane features and will be understood by reading and studying the following specification.

In one embodiment, a method for processing extracted plane features includes: estimating an area of each plane of a plurality of planes extracted from data collected by an imaging sensor; generating a list of detected planes including the area of each plane; filtering the list of detected planes to produce a list of candidates for merger, filtering the list of detected planes discarding any plane not satisfying an actual points received criteria; applying a primary merge algorithm to the list of candidates for merger that iteratively produces a list of merged planes by testing hypothetical merged planes against a merging criteria, the hypothetical merged planes each comprising a plane from the list of merged planes and a plane from the list of candidates for merger; and outputting a final list of planes.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide improved systems and methods for reducing false positive detections of planes in GPS-denied navigation solutions by providing techniques for plane merging and small plane removal. Embodiments of the present invention construct a predictor of the number of sensor returns that should be received for a given plane. Using the predictor, it is possible to identify false positives of the plane extractor and remove them from the set of planes, thus both speeding up and improving further processing, for example for navigation estimation. At the same time the invention uses a hypothesis and test approach for merging planes together. Pairs of planes are first compared and a threshold is set to avoid obviously different planes from being considered for merging. After this step is completed, for each pair of planes, a hypothetical merged plane is constructed. The hypothetical merged plane is then checked to determine whether it is indeed a plane (and not another geometrical shape) and whether it is similar to both planes that originated it. If so the hypothetical merged plane is kept in place of the two originating planes. For both the merging and small positives removal processes, an envelope model is utilized.

Figure 1:
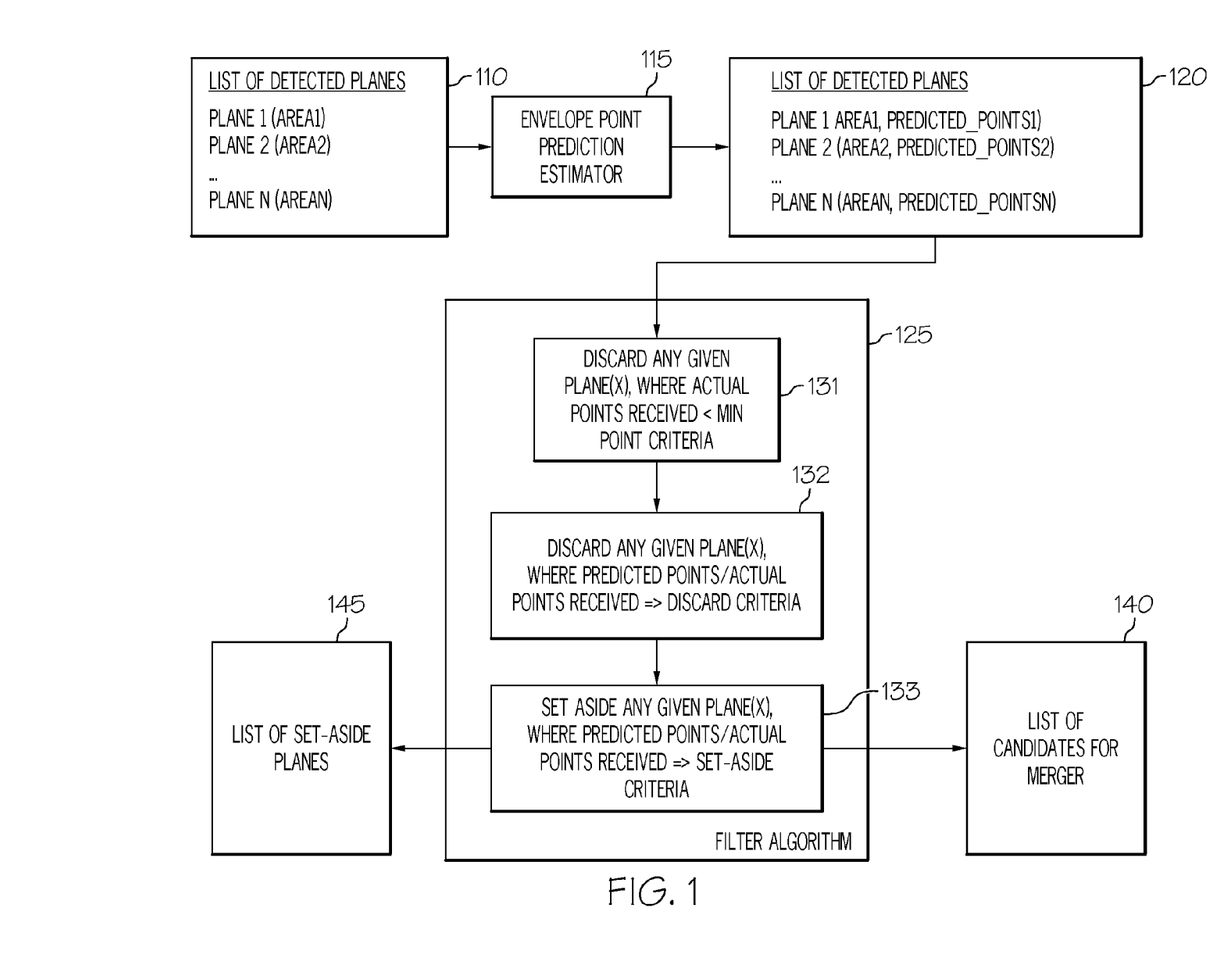
FIG. 1 is a diagram illustrating a filtering algorithm of one embodiment of the present invention.

As illustrated in FIG. 1, in one embodiment, a process begins with an initial list of detected planes 110 as determined from an imaging process such as described in the related '865 application, which is incorporated herein by reference. The process of obtaining the initial list of detected planes 110 is fully enabled for one of ordinary skill in the art by this reference and is not further discussed herein for that reason.

Algorithms are applied to the initial list of detected planes 110 to merge those planes that should be merged together, and otherwise remove those planes that are smaller than a minimum plane area threshold. Because larger planes in a real-work scene have a greater chance to be detected entirely and far less chance of being false positives, in one embodiment, the initial list of detected planes 110 is sorted so that detected planes with the greatest "area" appear first on the list. In other embodiments, different criterions for sorting might be used, e.g. density of point on a plane, plane location in the scene, etc. As would be appreciated by one of ordinary skill in the art upon reading this specification, because the data deemed to represent real-life planes is in fact only a set of sensor measurements, determining the plane area is a non-trivial task.

In one embodiment, the estimation of the plane area utilizes the envelope model prescribed in the 576 application. The envelope constructed around the plane is in fact an ashlar with four narrow sides orthogonal to the plane. The remaining two sides (the largest ones) are parallel with the plane. The area of either largest side of the envelope is used as a measurement of the area of the plane it represents. The two largest sides are parallel and both their shape and their area are identical. In other embodiments, other estimates of the plane area might be used.

In one embodiment, an envelope for a plane is constructed as follows based on determining a covariance matrix $\Sigma$ for the three-dimensional points set corresponding to the detected plane. A plane P is specified by its centroid c, points covariance matrix $\Sigma$, normal vector n and the orthogonal distance d. Having a plane P consisting of N plane points (sensor returns) $x_i$, the following relations hold:

$$d = n'c$$
$$c = \frac{1}{N}\sum_i x_i$$
$$\Sigma = \frac{1}{N-1}\sum_i (x_i - c)(x_i - c)'$$

The envelope is then constructed from the principal components of the plane as follows:

From the covariance matrix $\Sigma$ ne can get the eigenvalues $\lambda_1$, $\lambda_2$ and $\lambda_3$ and corresponding eigenvectors $v_1$, $v_2$ and $v_3$, where $\lambda_1 \geq \lambda_2 \geq \lambda_3$. The eigenvalues are variances in directions of eigenvectors (the principal components). Eigenvectors are orthogonal and both eigenvectors and eigenvalues depend on the orientation and size of the plane point-cloud in a 3-dimensional space. Moreover, since the point cloud is a plane, $v_3 \approx n$. Points in the $v_1$ and $v_2$ directions are spread rather uniformly while they are Gaussian in $v_3$ direction. In one embodiment, before constructing the envelope, $\lambda_1$ and $\lambda_2$ are each multiplied by $(0.9*\sqrt{3})^2$ to compensate for different spread of points in these directions. This correction ensures that the envelope is supposed to contain around 90% of plane points.

Because the eigenvalues are variances in the main directions, one can therefore take their square roots to get standard deviations. In one embodiment, the square root of the smallest eigenvalue ($\lambda_3$) is used to obtain a measurement of a plane's thickness. In other embodiments, other estimates of the plane's thickness might be used. The square roots of the remaining two eigenvalues ($\lambda_4$ and $\lambda_2$) are used to model the plane as a rectangle. Having unit-length eigenvectors $v_1$ and $v_2$, four corners of the rectangle that models the plane are then given by $c \pm \sqrt{\lambda_1}v_1 \pm \sqrt{\lambda_2}v_2$. The area of such rectangle is clearly given as $2*\sqrt{\lambda_1}*2*\sqrt{\lambda_2}$, which is our estimate of the plane size. The above description is just one way to estimate the plane area and is not meant to be limiting. Other means for defining area are available to those of ordinary skill in the art and can be used if those areas can be used to differentiate larger detected planes from smaller planes from the image data set. As already explained, the related '576 application prescribes a construction of a rectangular parallelepiped (or an ashlar) envelope around the point cloud representing the plane. Since eight vortices of such ashlar are given as $c \pm \sqrt{\lambda_1}v_1 \pm \sqrt{\lambda_2}v_2 \pm \sqrt{\lambda_3}v_3$, our representation is equivalent to taking the largest side from the ashlar (which has 6 sides—3 pairs, each pair consisting of sides of exactly same shapes) and using it to estimate the plane area.

If the plane area estimate is used only for sorting purposes, in some embodiments, multiplicative constants can be omitted. For example, the estimate $\sqrt{\lambda_1}*\sqrt{\lambda_2}$ could be used instead of $2*\sqrt{\lambda_1}*2*\sqrt{\lambda_2}$ and the multiplication by $(0.9*\sqrt{3})^2$ as mentioned above can be skipped.

Once an area for each of the detected planes is calculated, the list of detected planes 110 is sorted by area in descending order. This ordering is performed because the largest detected planes are the most likely to be real and distinct planes rather than false positives, and thus are the most stable and provide the most accurate estimates. As mentioned above, in some embodiments, other sorting criteria might be used than the plane area.

For each plane in the detected plane list 110, the point prediction estimator calculates a number of predicted points that can be expected to form the plane for given plane's parameters. This can alternately be performed either before or after list of detected planes 110 is sorted by area. Point prediction is sensor specific. That is, for a plane of a given size, location, and orientation, one can expect there to be "N" number of point returns on that plane when the resolution of the sensor is known. For example, for the Velodyne LiDAR, lasers are distributed in specific horizontal and vertical angular resolutions. The number of laser points returned for a given plane depends on the distance of the plane (not the orthogonal distance), the angle under which it is seen from the point of view of the LiDAR, and the size of the plane.

In one embodiment, one can use spherical angle to predict the number of sensor returns. There are many algorithms for spherical angle computation known to persons skilled in the art. Having the spherical angle, the number of returns can be predicted when the angular resolution of the sensor is known.

In the explanations that follow, the sensor used to obtain images is the Velodyne LiDAR HDL-64E. One of ordinary skill in the art after reading this specification would appreciate that description provided below is readily adapted to other sensors.

Since the performance of the spherical angle predictor is not always sufficient, in another embodiment, a model-based estimator might be used. First, the plane is again modeled by the rectangular model described above. In this case, include all multiplication constants when constructing the rectangular model. So, the rectangular model vertices are given by $c \pm \sqrt{\lambda_1}v_1 \pm \sqrt{\lambda_2}v_2$, where both $\lambda_1$ and $\lambda_1$ are before multiplied by $(0.9*\sqrt{3})^2$ as described above. The challenge is that the rectangular model will not likely be orthogonal to the direction of view, but it is typically skewed in various directions.

We proceed constructing the number of points (sensor returns) prediction model the following way. Recalling that a plane is represented by its equation n'x=d and its centroid c, projection axes for a Velodyne LiDAR, $u_V$; $v_V$; $w_V$ are computed the following way:

1.

$$u_v = \frac{c}{\|c\|}$$

2. $v_V$ is given by the following conditions $v_V' u_V=0$: and $v'_V[0\ 0\ 1]=0$. This specifies a line. When the norm is 1, two solutions emerge differing by sign either of which can be picked. The solution is found as $$v_V = \frac{1}{\sqrt{u_V(1)^2 + u_V(2)^2}}[-u_V(2)\ u_V(1)\ 0].$$

This formula does not provide a unique solution in a special case, when $c/\|c\|=[0\ 0\ 1]$. In such a case, any unit-length vector orthogonal to $[0\ 0\ 1]$ can be picked as vv, for example $[1\ 0\ 0]$.

$$w_V = u_V \times v_V \qquad 3.$$

To estimate lengths of intersection of the rectangle envelope and both horizontal and vertical projection planes, define the horizontal projection plane as $w'_V x=0$ and the vertical projection plane as $v'_V x=0$, x being an arbitrary point in three-dimensional space. Looking at the horizontal case first, compute the direction vector $d_h$ of the intersection from the following conditions: $d_h' n=0$ ($d_h$ belongs to the plane), $d_h' w_V=0$ ($d_h$ belongs to the horizontal projection plane), and $d_h' v_V=1$ ($d_h$ is not orthogonal to $v_V$). The vertical direction vector $d_v$ is derived the same way. Therefore we get:

$$d_h = \begin{bmatrix} n' \\ w'_V \\ v'_V \end{bmatrix}^{-1} \begin{bmatrix} 0 \\ 0 \\ 1 \end{bmatrix}, d_v = \begin{bmatrix} n' \\ w'_V \\ v'_V \end{bmatrix}^{-1} \begin{bmatrix} 0 \\ 1 \\ 0 \end{bmatrix}$$

$d_v$ and $d_h$ are further normalized, since they are not unit-length by default.

Denoting the vectors representing sides of the plane-rectangle as a,b (with their norm being equal to rectangle sides), also denote $$d_a = \frac{a}{\|a\|} \text{ and } d_b = \frac{b}{\|b\|}.$$

Starting with $d_h$, compute intersections with two infinite-length bands, one formed by 'b' sides of the rectangle and the second one formed by 'a' sides. The minimum of those two is the intersection with the rectangle envelope. Therefore, for the length of horizontal intersection $i_h$, we have $$i_h = \min\left\{\frac{\|a\|}{|d'_a d_h|}, \frac{\|b\|}{|d'_b d_h|}\right\}.$$

Similarly, for the vertical intersection, $$i_v = \min\left\{\frac{\|a\|}{|d'_a d_v|}, \frac{\|b\|}{|d'_b d_v|}\right\}.$$

Having $i_v$, $i_h$, compensate for skewness of the plane, taking $i_v \cdot |d'_v w_V|$ and $i_h \cdot |d'_h v_V|$ instead. Since compensated $i_v \cdot |d'_v w_V|$ and $i_h \cdot |d'_h v_V|$ are evaluated on a vector orthogonal to c, use trigonometric functions to obtain $\alpha_h$ and $\alpha_v$ using $$\tan\left(\frac{\alpha_h}{2}\right) = \frac{i_h \cdot |d'_h v_V|}{2\|c\|}, \tan\left(\frac{\alpha_v}{2}\right) = \frac{i_v \cdot |d'_v w_V|}{2\|c\|}$$

The final estimate of points on the plane for Velodyne LiDAR HDL-64E is given as $$\text{predicted points} = \frac{\alpha_h \alpha_v}{(0.09)(0.4)}$$

Accordingly, the estimator 115 updates the list of detected planes 110 to include a predicted point estimate for each plane in the list, as shown at 120.

The process proceeds to a filter algorithm, illustrated at 125, which removes suspected false planes from the list of detected planes 110, based on area and predicted point estimates, to arrive at a list of planes that are candidates for merger 140. Filter algorithm 125 first discards any plane(x) from the list of detected planes 110 that contains fewer laser returns in either the vertical or horizontal direction than a predetermined minimum point criteria (shown at 131). For example, in one embodiment, filter 125 discards any plane whose envelope contains less than 4 laser returns in vertical direction, or less than 7 laser returns in horizontal direction. Next, filter 125 applies a second criteria and compares the number of actual laser return points received within the envelope against the number of predicted points estimated for that plane by point prediction estimator 115 (shown at 132). For example, in one embodiment, filter algorithm 125 discards any plane(x) from the list of detected planes 110 where the ratio of the number of predicted points to the number of actual points is greater than or equal to a discard criteria (for example, 8). Planes from the list of detected planes 110 that emerge from the filter 125 form the list of candidates for merger 140. Note that the remaining planes in the list of candidates for merger 140 remain sorted from largest area to smallest area.

In one embodiment, an optional third criteria is applied after the second criteria (shown at 133). Filter algorithm 125 will "set aside" any remaining planes in the list of detected planes 110 where the ratio of the number of predicted points to number of actual points is greater than or equal to a "set aside" criteria (for example ≥5). Planes that meet this set aside criteria will be removed from the list of detected planes 110 but not discarded. Instead, set aside planes are placed into a separate list of "set-aside" planes 145 which will be separately considered for merging as described in more detail below. Accordingly, for embodiments that apply this optional third criterion, planes from the list of detected planes 110 that are not discarded or set-aside emerge from the filter 125 as the list of candidates for merger 140.

Figure 2:
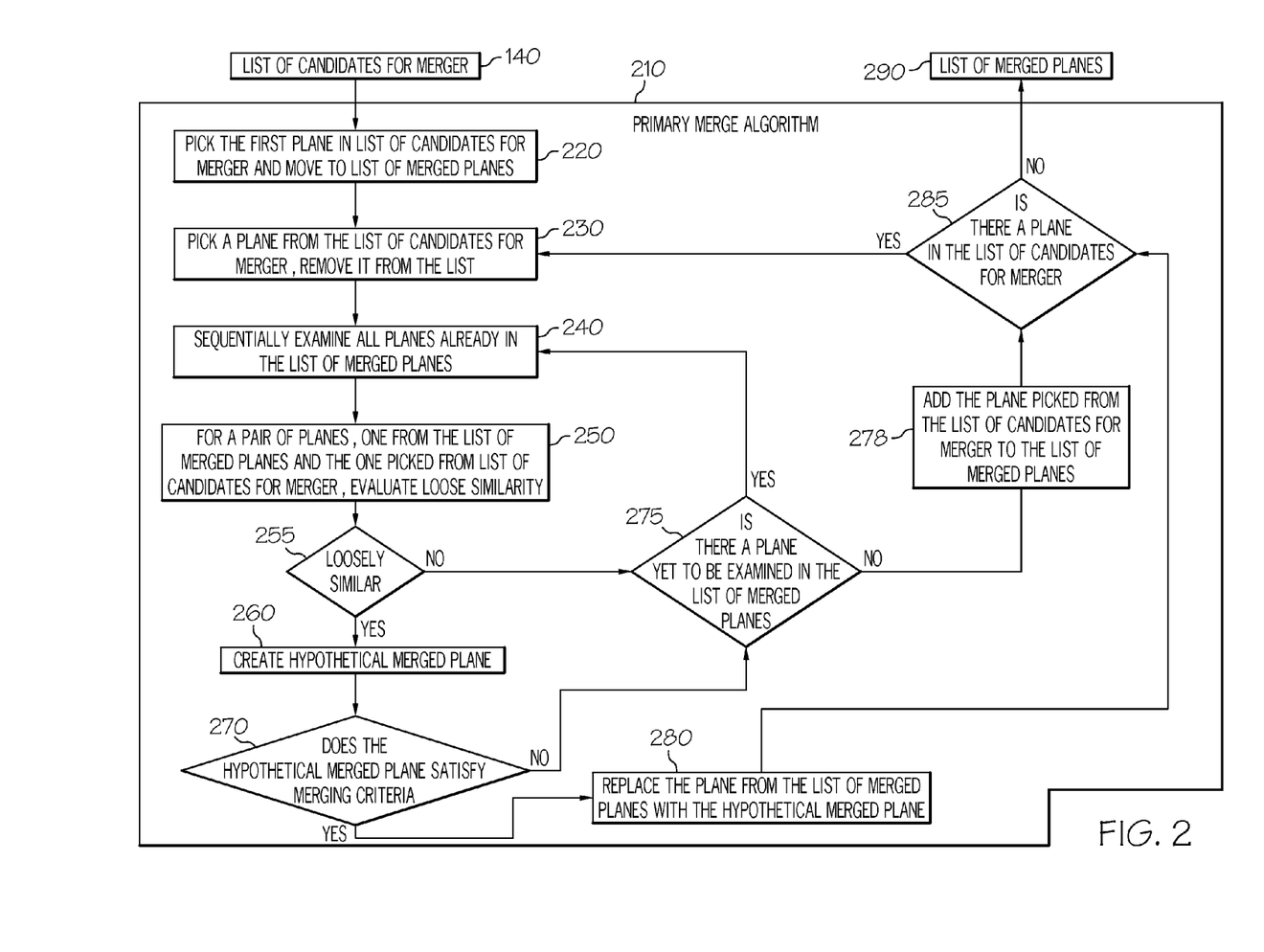
FIG. 2 is a diagram illustrating a primary merge algorithm of one embodiment of the present invention.

In one embodiment, the process for building a list of merged planes is described in FIG. 2, which describes the primary merge algorithm 210. As explained below, the primary merge algorithm 210 iteratively processes every plane in the list of candidates for merger 140 to determine which planes can be merged together, and which planes are likely completely distinct planes that do not require merger.

Primary merge algorithm 210 begins by seeding a list of merged planes, 290, by selecting the largest plane from the list of candidates for merger 140 and moving it into list of merged planes, shown at 220. Since the list of candidates for merger 140 is sorted by area in descending order, the largest plane will be the first plane from that list.

In each iteration, the primary merge algorithm 210 takes the first (the largest, since the list is ordered by size in descending order) plane from the list of candidates for merger 140 (shown at 230) and removes it from the list. The method then continues at block 240 by sequentially examining all planes that are already in the list of merged planes. For each pair of planes formed by the plane taken from the list of candidates for merger and by a plane from the list of merged planes the "loose similarity" is checked (shown at 250). In one embodiment, for navigation applications, two planes are considered loosely similar if the angle of their normal vectors is no more that 15 degrees and the orthogonal distances of the planes differ by no more than 1 meter.

At block 255, if a pair of planes is not loosely similar, then the algorithm continues by step 240 sequentially examining other planes in the list of merged planes and proceeds to consideration of the next pair. When a pair of planes are at least loosely similar, algorithm 210 proceeds with creating hypothetical merged plane as shown at 260.

When a pair of planes are at least loosely similar, primary merge algorithm 210 creates a hypothetical merged plane from the two planes (i.e., a first plane from the merged plane list and a second plane picked from the candidates for merger 140), at block 260, and by mathematical computation determines the characteristic parameters of the hypothetical merged plane such as, but not limited to, the hypothetical merged plane's mean point, centroid, normal vector, and plane thickness.

The primary merge algorithm, 210, continues by checking the pre-defined merging conditions (discussed below) at block 270. If the merging conditions are met, the hypothetical merged plane replaces the first plane from the pair in the list of merged planes and the method returns to block 230, where another candidate for merger is picked from the list of candidates for merger, 140. When the hypothetical merged plane fails to meet the merging conditions, the first plane is left in the list of merged planes 290 and the iterative process continues by picking another plane from the list of merged plane 290, in step 240. When a given plane from the list of merger candidates is tested against every plane in the merged plane list and fails to meet the merging conditions with any of those planes, then that given plane is, in block 278, added to the list of merged planes 290 as a distinct plane, and removed from the list of candidates for merger 140. Such a plane is simply added to the list of merged planes because it most likely represents an independent distinct plane in the real world scene rather than a fragment of another plane already in the merged plane list. The algorithm 210 continues until all candidate planes from the list of candidates for merger 140 are either merged into a plane in the merged plane list 290, or added to the merged plane list 290 as a distinct plane (shown at 285).

Figure 6:
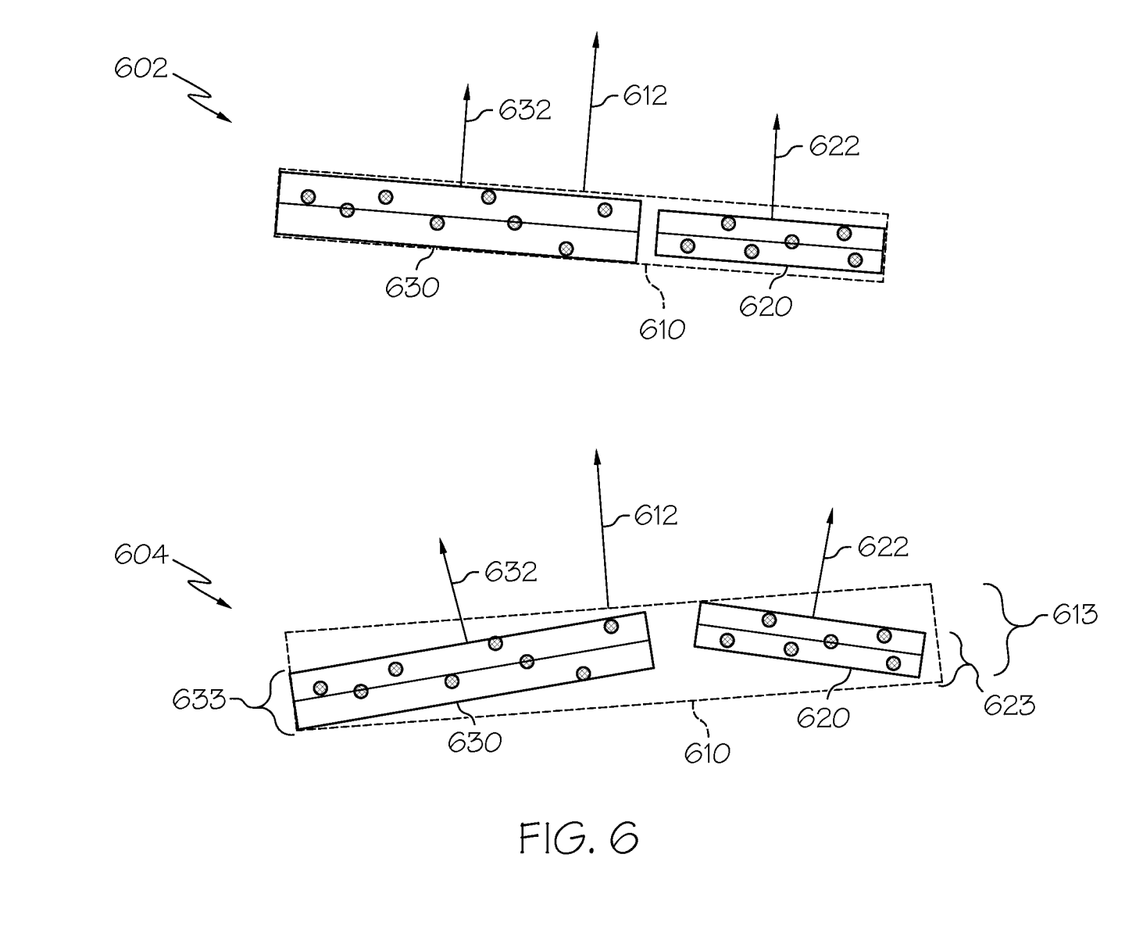
FIG. 6 is a diagram illustrating merging criteria of one embodiment of the present invention.

As discussed above, a hypothetical merged plane is a valid merged plane, and thus retained and added to the merged plane list 290, only when it satisfies the merging criteria. In one embodiment, the merging criteria comprise both a normal vector criterion and a thickness criterion, which are both illustrated in FIG. 6. In FIG. 6, plane 630, from the merged plane list 290, has a normal vector 632 and thickness 633. Plane 620, from the list of candidates for merger 140, has a normal vector 622 and thickness 623. The hypothetical merged plane 610, formed by merging planes 620 and 630, has a normal vector 612 and thickness 613.

With respect to the normal vector criterion, the criterion is satisfied when the angle of the normal vectors (622, 632) of the first plane and the second plane (620, 630) each differ from the angle of the normal vector 612 of the hypothetical plane 610 by no more than a pre-set degree criterion. For example, in one embodiment, the normal vector criterion is satisfied when the angle of the normal vector 612 of the hypothetical merged plane 610 is no more that 3 degrees off from the normal vectors (622, 632) of either the first or second plane (620, 630). FIG. 6 at 602 illustrates where normal vectors 612, 622 and 632 are substantially parallel, and thus satisfy the normal vector criterion. FIG. 6 at 604 illustrates where either the angle between normal vectors 612 and 622, or between normal vectors 612 and 632 exceeds 3 degrees and thus fails the normal vector criterion. That is, if the angle between the either normal vector (622, 632) and normal vector 612 exceeds the degree criterion, then the hypothetical merged plane 610 fails the normal vector criterion and the merged plane will not be added to the merged plane list 290.

With respect to the thickness criterion, in one embodiment, when the thickness 613 of the hypothetical merged plane 610 is within 120% of larger of the thicknesses 623, 633 of the first or second planes 620, 630 then the thickness criterion is met. As shown in FIG. 6, the degree to which the hypothetical merged plane 610's thickness is greater than the thickness of the two component planes 620, 630 can be used to judge whether the two component planes 620, 630 are likely parts of the same real-world plane. For example, FIG. 6 at 602 illustrates where the thickness of the hypothetical merged plane 610 is only marginally thicker than the thickness of the plane 630, which is the thicker of the two component planes. The configuration would satisfy the thickness criterion. In contrast, FIG. 6 at 604 shows that because planes 620 and 630 are ill-fitted and misaligned, a hypothetical merged plane 610 formed from them has a significantly greater thickness than either of planes 620 or 630. If thickness 613 is greater than the criterion (120% of larger of the thicknesses 623, 633) then hypothetical merged plane 610 fails the thickness criterion.

In another embodiment, the thickness criterion is slightly modified such that it is further tested against a maximum plane thickness threshold (such as 0.04 meters, for example). Thus, in such an embodiment, the thickness criterion is satisfied when thickness 613 of the hypothetical merged plane 610 is less than or equal to 1.2 times the maximum of [thickness 623, thickness 633, and 0.04 meters].

In one embodiment, assuming that no optional list of "set-aside" planes was generated, then the output from the primary merge algorithm 210 represents the final list of planes. In one alternate embodiment, to arrive at a final list of planes, those planes from the merged plane list that have an area is less than or equal to a minimum area threshold (such as 0.1 $m^2$, for example) are discarded. The final list of planes may then optionally be sorted by area.

In one embodiment, where the optional list of "set-aside" planes was generated, a secondary merge algorithm 310 is applied to determine whether any of the "set-aside" planes can be merged with any plane from the list of merged planes generated by the primary merge algorithm 210. This process is described in FIG. 3.

Figure 3:
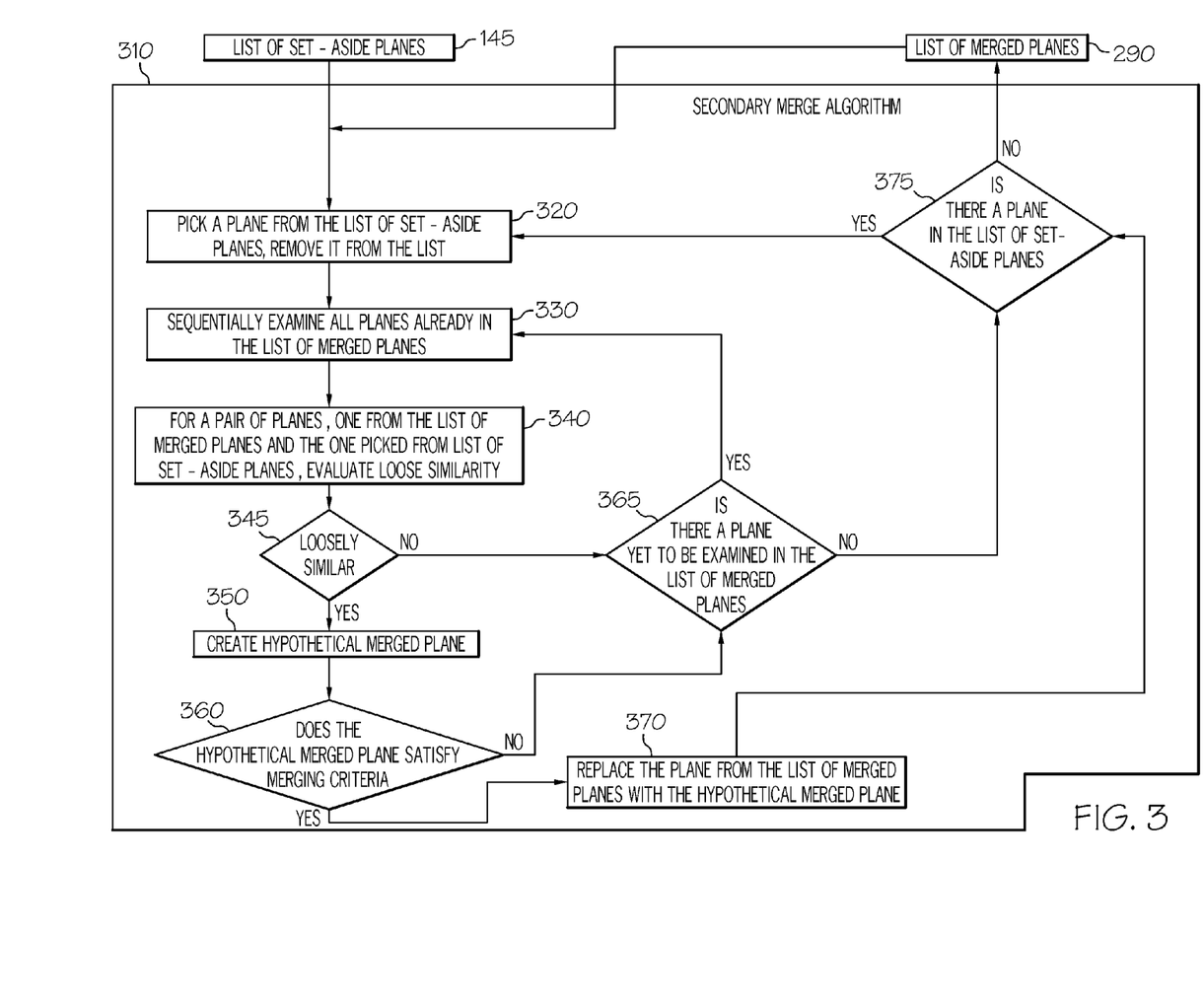
FIG. 3 is a diagram illustrating a secondary merge algorithm of one embodiment of the present invention.

The secondary merge algorithm attempts to merge planes from the list of set-aside planes 145 with planes in the list of merged planes 290. Planes in the list of set-aside planes that are not "loosely similar" to any plane in the list of merged planes are discarded.

In each iteration, the secondary merge algorithm 310 takes the first plane from the list of set-aside planes 145 (shown at 320) and removes it from the list. The method then continues at block 330 by sequentially examining all planes that are already in the list of merged planes. For each pair of planes formed by the plane taken from the list of set-aside planes and by a plane from the list of merged planes the "loose similarity" is checked (shown at 340).

At block 345, if a pair of planes is not loosely similar, then the algorithm continues by step 330 sequentially examining other planes in the list of merged planes and proceeds to consideration of the next pair. When two planes in the pair are loosely similar, the algorithm 310 proceeds with creating a hypothetical merged plane and, by mathematical computation, determines the characteristic parameters of the hypothetical merged plane (illustrated at 350).

The secondary merge algorithm, 310, continues by checking the pre-defined merging conditions at block 360. If the merging conditions discussed above are met, as shown at 370 the hypothetical merged plane replaces the first plane, from the pair, in the list of merged planes and the method returns to block 320, where another candidate for merger is picked from the list of set-aside planes, 145. When a second plane, from the pair, picked from the list of set-aside planes is tested against every plane in the merged plane list and fails to meet the margining conditions, the second plane is discarded. As shown at 375, secondary merge algorithm 310 iteratively processes the list of set aside planes 145 until every plane in that list is either merged into the list of merged planes 290, or discarded.

For this embodiment, the resulting list of merged planes 290 that is output from the secondary merge algorithm 310 represents the final list of planes. In another alternate embodiment, to arrive at a final list of planes, those planes emerging from secondary algorithm 310 that have an area is less than or equal to a minimum area threshold (such as 0.1 m$^2$, for example) are discarded. The final list of planes may then optionally be sorted by area.

Figure 7:
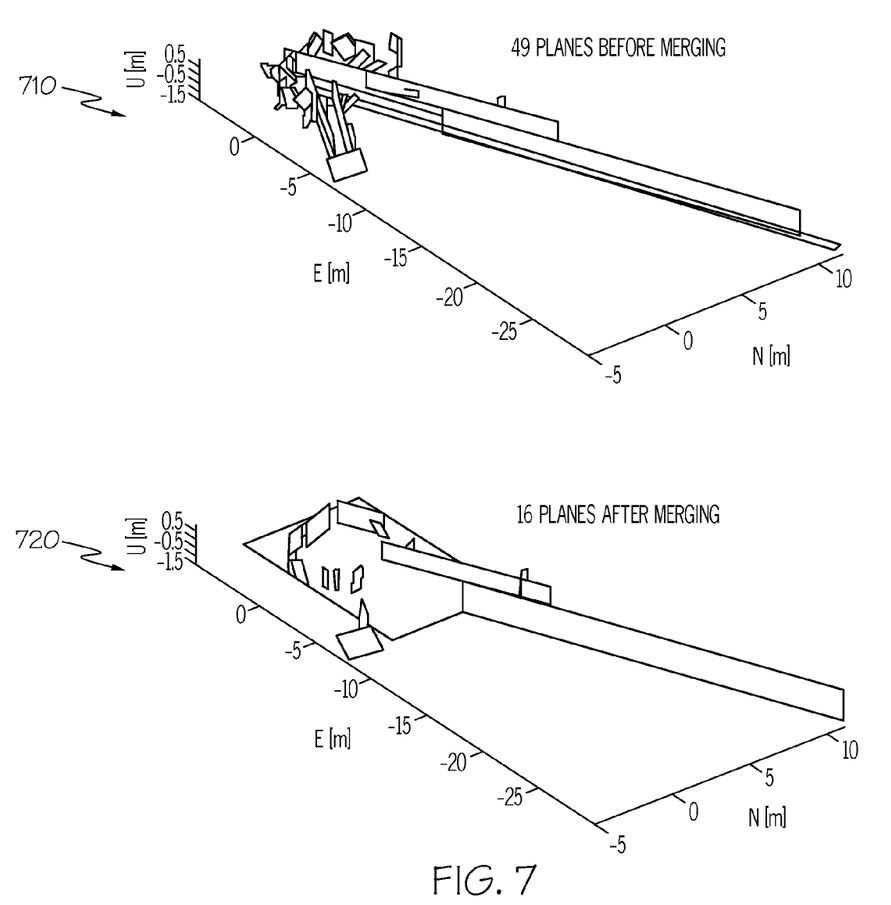
FIG. 7 is a diagram illustrating the effectiveness of a merging process of one embodiment of the present invention.

FIG. 7 illustrates the effectiveness of the merging process described above. Prior to being processed (shown at 710), the list of detected planes 110 includes 49 planes. Application of both the primary and the secondary merging algorithms 210 and 310 both merges and discards planes from the initial 49 detected planes to arrive at 16 planes (shown at 720) that more accurately represent the existence and position of real-world planes in the real-world scene as captured by the sensor.

Figure 4:
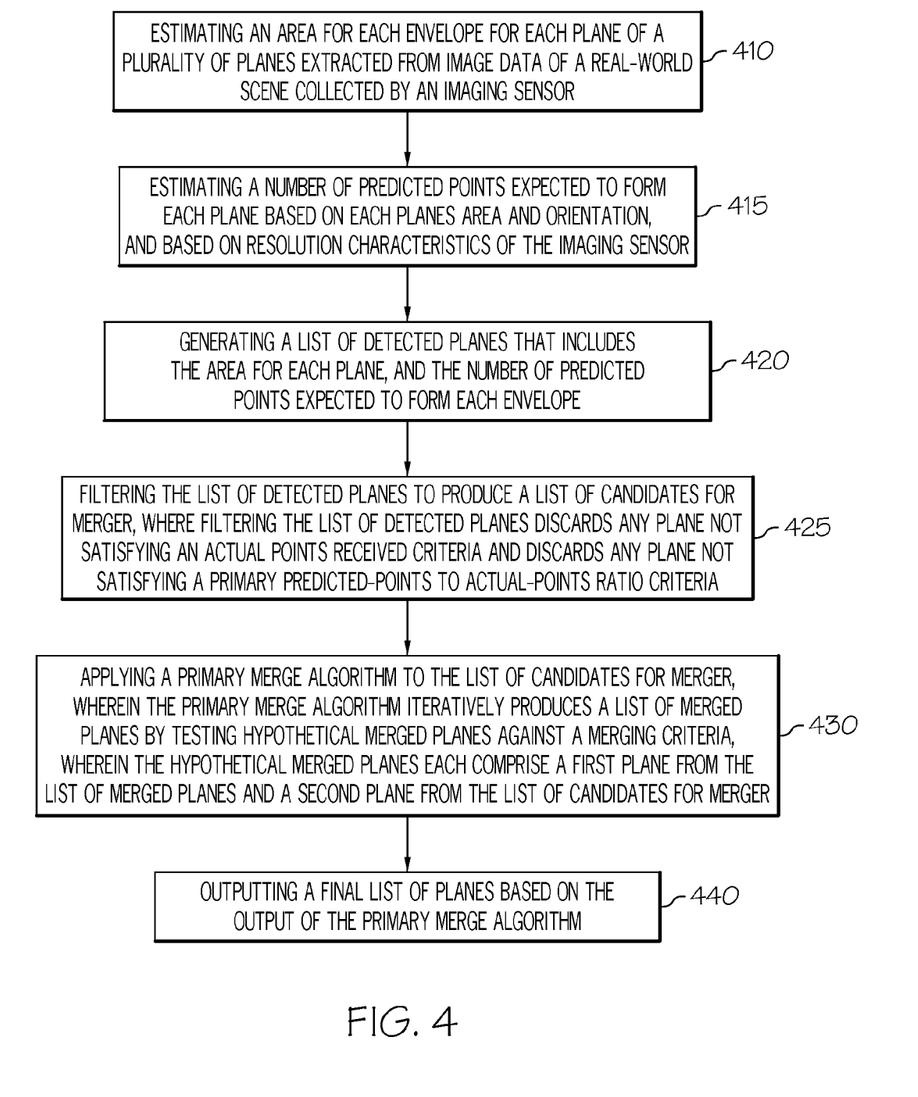
FIG. 4 is a diagram illustrating a process of one embodiment of the present invention.

FIG. 4 is a flow chart illustrating one embodiment of a method for merging planes as detailed above. The method begins at 410 by estimating an area for each plane of a plurality of planes extracted from image data of a real-world scene collected by an imaging sensor. In one embodiment, the area of a plane is estimated using the envelope model discussed above and the area for a plane's envelope is calculated from multiplying the square roots of the two larger eigenvalues of the plane's covariance matrix.

The method proceeds to 415 with estimating a number of predicted points expected to form each plane based on its area and orientation, and based on resolution characteristics of the imaging sensor. That is, for a given sensor, a given number of return points can be estimated for plane of a given size and relative orientation with respect to the sensor. One means for calculating predicted point is provided above.

The method proceeds to 420 with generating a list of detected planes that includes, but is not limited to, the area of each plane, and the number of predicted points expected to form the plane. The planes in list of detected planes are ordered by plane area in descending order, as described above.

The method proceeds to 425 with filtering the list of detected planes to produce a list of candidates for merger, where filtering the list of detected planes discards any plane not satisfying an actual points received criterion and discards any plane not satisfying a primary predicted-points to actual-points ratio criterion. In one embodiment, filtering the list of detected planes further identifies a list of set-aside planes that satisfy the primary predicted-points to actual-points ratio criterion but do not satisfy a secondary predicted-points to actual-points ratio. These planes are set-aside for later processing to see if they can be merged with planes formed by the first merging algorithm. If they cannot be merged, they are discarded. Planes included in the list of set-aside planes are not also included in the list of candidates for merger.

The method proceeds to 430 with applying a primary merge algorithm to the list of candidates for merger, wherein the primary merge algorithm iteratively produces a list of merged planes by testing hypothetical merged planes against a merging criteria, wherein the hypothetical merged planes each comprise a first plane from the list of merged planes and a second plane from the list of candidates for merger. As discussed above, if the hypothetical merged plane satisfies the merging criteria, the primary merge algorithm replaces the first plane in the list of merged planes with the hypothetical merged plane, and removes the second plane from the list of candidates for merger. When a plane from the list of merger candidates does not satisfy the merging criteria to be merged with any plane in the list of merged planes it is moved from the list of candidates for merger to the list of merged planes as a distinct plane. In one embodiment the primary merge algorithm selects the second plane from the list of candidates (that is, to form a hypothetical merged plane) only when the second plane satisfies a pre-determined criteria for being loosely similar to the first plane. The criterion for being loosely similar is discussed above.

In one embodiment, when the list of set-aside planes is optionally generated at 425, the method further optionally includes applying a secondary merge algorithm using the list of candidates for merger and the list of set-aside planes. The secondary merge algorithm tests hypothetical merged planes that each comprises of a first plane from the list of merged planes and a second plane from the list of set-aside planes against the merging criteria. When these hypothetical merged planes satisfy the merging criteria, they are retained. The hypothetical merged plane replaces the plane from the list of merged planes while the plane from the list of set-aside planes is discarded. All planes from the list of set-aside planes that cannot satisfy the merging criteria for at least one plane from the list of merged planes are discarded.

The method proceeds to 440 with outputting a final list of planes based on the output of the primary merge algorithm. In one embodiment, prior to outputting the final list of planes, the list is filtered to remove any plane that has an area not satisfying a minimum area threshold (such as 0.1 m$^2$, for example) In one embodiment, the final list of planes is sorted by area. In one embodiment, the final list of planes is stored to a physical data storage device such as, but not limited to a drive or memory.

The method described above thus can be viewed as performing two separate tasks. One removes false positives which are planes discarded because they are defined by only a small number of points compared to the number of points we would expect. The other performs the merging of planes.

The two tasks can operate independently and in alternate embodiments, either can be skipped. For example, the primary merge algorithm in block 430 can, in one embodiment, operate on a list of detected planes that has not been filtered based on predicted point estimates.

Figure 5:
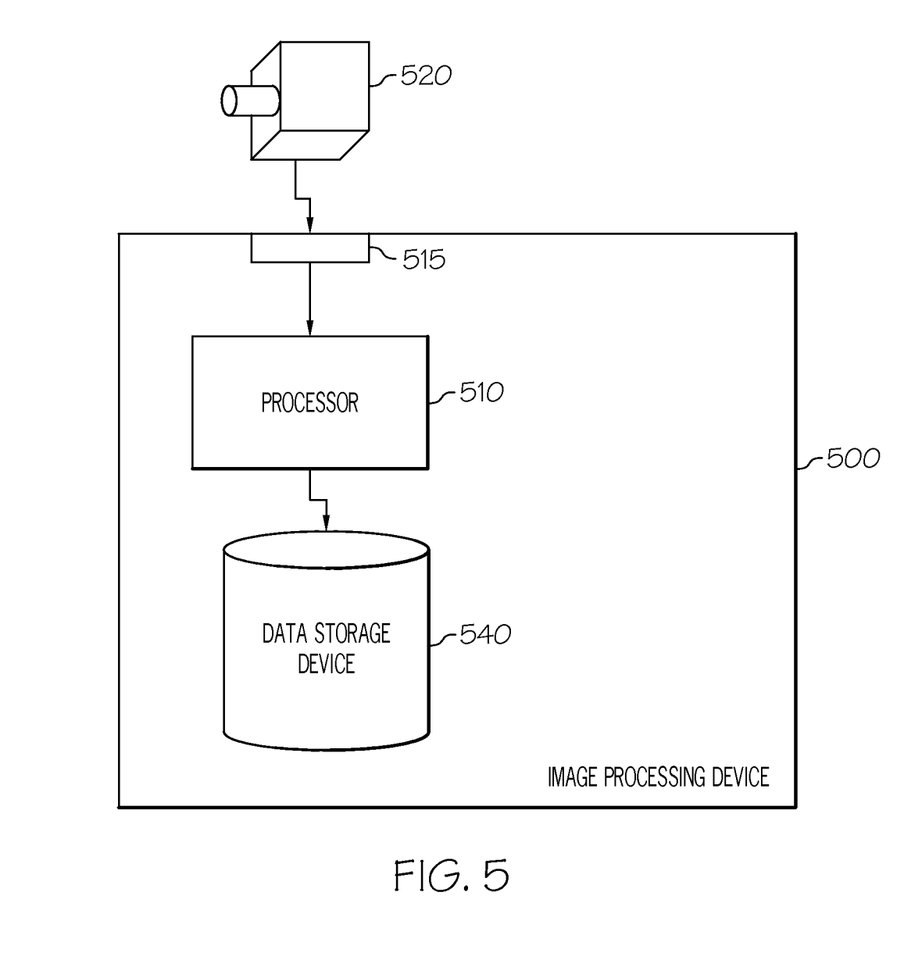
FIG. 5 is a diagram illustrating a processing device of one embodiment of the present invention.

FIG. 5 is a system block diagram illustrating a processing device 500 of one embodiment of the present invention. The processing device 500 comprises a processor 510 and an interface 515 that couples the processor 510 to a sensor 520. In one embodiment, the sensor 520 comprises a LiDAR device. The processing device further comprises at least one data storage device 540 having stored thereon detected plane data for a plurality of planes extracted from data from a real-world scene collected by the sensor 520. In one embodiment, processor 510 executes code stored on data storage device 540 to implement one or more of the algorithms discussed above with respect to FIGS. 1, 2 and 3 and/or the method described in FIG. 4.

In one embodiment, in operation, the processor 510 executes at least one algorithm stored on the data storage device 540 that estimates both an area and a number of predicted points for each plane. The number of predicted points is calculated based on the area and orientation of each plane, and based on resolution characteristics of the sensor 520. Processor 510 then generates a list of detected planes that includes, among other plane parameters, each plane's area and the number of predicted points expected to form the plane. In one embodiment, the list of detected planes is stored on storage device 540. The processor 510 then applies at least one filtering algorithm that discards from the list of detected planes any plane not satisfying an actual points received criterion. The filter algorithm also discards any plane not satisfying a primary predicted-points to actual-points ratio criterion. The output from the filtering algorithm is a list of candidates for merger, which in at least one embodiment is stored on storage device 540. The processor 510 applies a primary merge algorithm that iteratively produces a list of merged planes by testing hypothetical merged planes against a merging criterion. The merging criterion is discussed above. As discussed above, the hypothetical merged planes each comprise a first plane from the list of merged planes and a second plane from the list of candidates for merger. In one embodiment, the primary merge algorithm selects the second plane from the list of candidates when the second plane satisfies a pre-determined criterion for being loosely similar to the first plane. The processor 510 can optionally also apply a secondary merge algorithm that iteratively tests a list of set-aside planes against the list of merged planes by testing hypothetical merged planes against the merging criteria. The processor 510 writes to data storage device 540 a final list of planes derived from the output of the primary merge algorithm and/or the optional secondary merge algorithm.

Several means are available to implement the systems and methods of the current invention as discussed in this specification. These means include, but are not limited to, digital computer systems, microprocessors, general purpose computers, programmable controllers and field programmable gate arrays (FPGAs) or application-specific integrated circuits (ASICs). Therefore other embodiments of the present invention are program instructions resident on computer readable media which when implemented by such means enable them to implement embodiments of the present invention. Computer readable media include any form of a physical computer memory storage device. Examples of such a physical computer memory device include, but is not limited to, punch cards, magnetic disks or tapes, optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for processing extracted plane features, the method comprising:
   estimating an area of each plane of a plurality of planes extracted from data collected by an imaging sensor;
   generating a list of detected planes that includes the area of each plane of the plurality of planes;
   filtering the list of detected planes to produce a list of candidates for merger, where filtering the list of detected planes discards any plane not satisfying an actual points received criteria;
   applying a primary merge algorithm to the list of candidates for merger, wherein the primary merge algorithm iteratively produces a list of merged planes by testing hypothetical merged planes against a merging criteria, wherein the hypothetical merged planes each comprise a first plane from the list of merged planes and a second plane from the list of candidates for merger, wherein the merging criteria includes a normal vector criterion and a relative thickness criterion;
   wherein the normal vector criterion is satisfied for a first hypothetical merged plane when angles formed between a normal vector of the hypothetical merged plane and the normal vectors of the first plane and the second plane do not exceed a maximum degree criteria;
   wherein the relative thickness criterion is satisfied when a calculated thickness for the hypothetical merged plane is no greater than a predetermine thickness value that is determined from a function of the thickness of the first plane and the thickness of the second plane; and outputting a final list of planes based on the output of the primary merge algorithm.

2. The method of claim 1, wherein planes in the list of detected planes are ordered by decreasing area.

3. The method of claim 1, further comprising:
   estimating a number of predicted points expected to form each plane based on the area and orientation of each plane, and based on resolution characteristics of the imaging sensor;
   wherein generating a list of detected planes further includes generating a list of detected planes that includes the area for each plane, and the number of predicted points expected to form each plane.

4. The method of claim 3, wherein filtering the list of detected planes to produce a list of candidates for merger further discards any plane not satisfying a primary predicted-points to actual-points ratio criteria.

5. The method of claim 4, wherein filtering the list of detected planes further comprises generating a list of set-aside planes comprising one or more planes that satisfy the primary predicted-points to actual-points ratio criteria but do not satisfy a secondary predicted-points to actual-point ratio, wherein the one or more planes in the list of set-aside planes are not included in the list of candidates for merger.

6. The method of claim 5, further comprising:
applying a secondary merge algorithm using the list of candidates for merger and the list of set-aside planes, wherein the secondary merge algorithm tests against the merging criteria hypothetical merged planes that each comprise a first plane from the list of merged planes and a second plane from the list of set-aside planes.

7. The method of claim 1, further comprising:
removing from the final list of planes any plane that has an area not satisfying a minimum area threshold.

8. The method of claim 1, wherein when a first hypothetical merged plane comprising a first plane from the list of merged planes and a second plane from the list of candidates for merger satisfies the merging criteria, the primary merge algorithm replaces the first plane in the list of merged planes with the hypothetical merged plane, and removes the second plane from the list of candidates for merger.

9. The method of claim 8, wherein when the second plane from the list of merger candidates fails to satisfy the merging criteria with any plane in the list of merged planes, then the primary merge algorithm adds said second plane to the list of merged planes as a distinct plane, and removes said second plane from the list of candidates for merger.

10. The method of claim 1, wherein the primary merge algorithm selects the second plane from the list of candidates only when the second plane satisfies a pre-determined criteria for being loosely similar to the first plane.

11. A method for processing extracted plane features, the method comprising:
estimating a predicted number of sensor returns within each plane of a plurality of planes using a rectangular plane model, wherein each plane of the plurality of planes is extracted from data collected by an imaging sensor;
estimating an area of each plane of the plurality of planes extracted from data collected by an imaging sensor;
estimating a number of predicted points expected to form each plane based on the area and orientation of each plane, and based on resolution characteristics of the imaging sensor;
generating a list of detected planes that includes that area of each plane of the plurality of planes and the number of predicted points expected to form each plane of the plurality of planes;
filtering the list of detected planes to produce a second list of planes, where filtering the list of detected planes discards any plane not satisfying an actual points received criteria and further discards any plane not satisfying a primary predicted-points ratio criteria.

12. The method of claim 11, wherein filtering the list of detected planes further comprises:
generating a list of set-aside planes comprising one or more planes that satisfy the primary predicted-points to actual-points ratio criteria but do not satisfy a secondary predicted-points to actual-point ratio, wherein the one or more planes in the list of set-aside planes are not included in the second list of planes.

13. An image processing device, the image processing device comprising:
a processor;
an interface that couples the processor to an imaging sensor;
at least one data storage device having stored thereon detected plane data for a plurality of planes extracted from image data from a real-world scene collected by the imaging sensor;
wherein the processor estimates for each plane an area, and estimates a number of predicted points calculated from the area and orientation of each plane and based on resolution characteristics of the imaging sensor;
wherein the processor generates a list of detected planes that includes for each plane, the area and the number of predicted points expected to form the plane;
wherein the processor applies a filtering algorithm that discards from the list of detected planes any plane not satisfying an actual points received criteria and discards any plane not satisfying a primary predicted-points to actual-points ratio criteria, wherein the filtering algorithm outputs a list of candidates for merger;
wherein the processor applies a primary merge algorithm that iteratively produces a list of merged planes by testing hypothetical merged planes against a merging criteria, wherein the hypothetical merged planes each comprise a first plane from the list of merged planes and a second plane from the list of candidates for merger, wherein the merging criteria includes a normal vector criteria and a relative thickness criteria;
wherein the normal vector criteria is satisfied for a first hypothetical merged plane with angles formed between a normal vector of the hypothetical merged plane and the normal vectors of the first plane and the second plane do not exceed a maximum degree criteria; and
wherein the relative thickness criteria is satisfied when a calculated thickness for the hypothetical merged plane is no greater than a predetermine thickness value that is determined from a function of the thickness of the first plane and the thickness of the second plane; and
wherein the processor writes to the at least one data storage device a final list of planes derived from the output of the primary merge algorithm.

14. The device of claim 13, wherein the processor applies an algorithm that removes from the final list of planes any plane that has an area not satisfying a minimum area threshold; and
wherein the primary merge algorithm selects the second plane from the list of candidates only when the second plane satisfies a pre-determined criteria for being loosely similar to the first plane.

15. The device of claim 13, wherein when a first hypothetical merged plane satisfies the merging criteria, the primary merge algorithm replaces the first plane in the list of merged planes with the hypothetical merged plane, and removes the second plane from the list of candidates for merger; and
wherein when the second plane from the list of merger candidates fails to satisfy the merging criteria with any plane in the list of merged planes, then the primary merge algorithm adds said second plane to the list of merged planes as a distinct plane, and removes said second plane from the list of candidates for merger.

16. The device of claim 13, wherein the filtering algorithm generates a list of one or more set-aside planes that satisfy the primary predicted-points to actual-points ratio criteria but do not satisfy a secondary predicted-points to actual-point ratio, and wherein the one or more planes in the list of set-aside planes are not included in the list of candidates for merger.

17. The device of claim 16, wherein the processor applies a secondary merge algorithm that iteratively tests against the merging criteria, hypothetical merged planes formed from an output of the primary merge algorithm and planes from the list of set-aside planes;
- wherein when a first hypothetical merged plane comprising a plane from the list of merged planes and a plane from the list of set-aside planes satisfies the merging criteria, the secondary merge algorithm replaces said plane from the list of merged planes with the first hypothetical merged plane, and discards the plane from the list of set-aside planes; and
- wherein when said second plane from the list of set-aside planes fails to satisfy the merging criteria with any plane from the list of merged planes, then the secondary merge algorithm discards said second plane from the list of candidates for merger.

* * * * *